United States Patent [19]

Carbone

[11] Patent Number: 4,812,918
[45] Date of Patent: Mar. 14, 1989

[54] METHOD AND APPARATUS FOR SCANNING AND DIGITIZING OPTICAL IMAGES

[76] Inventor: Anthony K. Carbone, Rte. 1, Box 250, Bluemont, Va. 22012

[21] Appl. No.: 746,638

[22] Filed: Jun. 20, 1985

Related U.S. Application Data

[63] Continuation-in-part of Ser. No. 403,425, Jul. 30, 1982, Pat. No. 4,525,743.

[51] Int. Cl.⁴ .............................. H04N 1/024
[52] U.S. Cl. .................... 358/293; 358/286; 358/296
[58] Field of Search ............ 358/293, 294, 284, 286, 358/283, 213, 289, 290, 291, 292, 296, 302, 280; 346/75, 78, 76 PH, 76 L; 400/124, 322

[56] References Cited

U.S. PATENT DOCUMENTS

| | | | |
|---|---|---|---|
| 4,034,400 | 7/1977 | Owen et al. | 358/78 |
| 4,122,352 | 10/1978 | Crean et al. | 250/566 |
| 4,147,928 | 4/1979 | Crean et al. | 250/566 |
| 4,149,090 | 4/1979 | Agulnek | 250/566 |
| 4,149,091 | 4/1979 | Crean et al. | 250/566 |
| 4,179,620 | 12/1979 | Agulnek | 250/566 |
| 4,179,621 | 12/1979 | Crean | 250/566 |
| 4,199,784 | 4/1980 | Wellendorf et al. | 358/296 |
| 4,203,136 | 5/1980 | Wellendorf et al. | 358/280 |
| 4,210,936 | 7/1980 | Cinque et al. | 358/284 |
| 4,240,117 | 12/1980 | Wellendorf et al. | 358/296 |
| 4,257,071 | 3/1981 | Lamb | 358/286 |
| 4,266,250 | 5/1981 | Heinzl et al. | 358/285 |
| 4,272,204 | 6/1981 | Quinn, Jr. et al. | 400/708 |
| 4,328,504 | 5/1982 | Weber et al. | 346/75 |

OTHER PUBLICATIONS

J. C. Edwards, "Image Transducer for a Typewriter", IBM Technical Disclosure Bulletin, vol. 23, No. 7B, 12/1980.

Byte Publications, Inc., pp. 220-248 (Feb. 1981).

*Primary Examiner*—Edward L. Coles, Sr.
*Attorney, Agent, or Firm*—Sandler & Greenblum

[57] ABSTRACT

A dot-matrix pinter is adapted to include an optical scanner for opto-electrically sensing the optical intensity levels of an image-bearing medium in order to provide a digitized representation of the image. The sensor can be mounted on a housing in the printer for continuous linear movement across the image while the sensor is scanning. Sampling means responsive to the printer strobe command signal is provided for sampling the output of the sensor at predetermined intervals. This output is loaded line by line into a memory buffer. Means for processing the sampled output of the sensor into a form compatible with a dot-matrix printer is also provided. A method of generating a digitized representation of an image using a dot-matrix printer adapted to include an optical scanner for optoelectrically scanning the optical intensity levels of an image-bearing medium is also provided. The representation can have either bilevel or gray-scale quality. In the case of gray-scale quality, the representation of the original image has more than one pixel space for containing dots corresponding to each sampled pixel in the original image whereby gray-scale resolution is provided by the distribution of dots in the reproduced image.

33 Claims, 11 Drawing Sheets

METHOD AND APPARATUS FOR SCANNING AND DIGITIZING OPTICAL IMAGES

RELATED APPLICATION

This application is a continuation-in-part of copending application Ser. No. 403,425 filed July 30, 1982, now U.S. Pat. No. 4,525,743.

FIELD OF THE INVENTION

This invention relates to a method and apparatus for scanning and digitizing optical images, and for producing digitized representations of the image.

BACKGROUND OF THE INVENTION

Generally, the acquisition of optical image data for computer storage and/or facsimile transmission requires the use of complex optical sensors. Typically these have ranged from vacuum tube type photodiodes, photo-transistor devices, charge-coupled devices, and the like. Generally, these sensors require an external light source capable of uniformly illuminating the image to be acquired. Because of this requirement, the physical size of these sensors is often large. In addition, they require a lens for optically focussing an image onto the photosensitive region of the sensor which adds to the complexity of the apparatus.

Several techniques are known for acquiring optical image data using a scanning procedure. One technique uses a horizontal array of optical sensors that view the medium containing the image while it is uniformly illuminated by a horizontally disposed light source. In this technique, the medium is moved vertically relative to the optical sensor array. Another technique uses a vertical array of optical sensors and a uniform, vertically disposed light source; and the array is moved horizontally across the image in one pass. Afterwards, the image is vertically displaced by an amount equal to the vertical height of the optical sensor array. Both of these techniques require special mechanical apparatus specifically designed to effect the required movement of the image bearing medium and the optical sensor.

While both of the above described techniques perform satisfactorily, the equipment required is relatively costly. It is an object of the present invention to provide a new and improved scanning technique based on relatively inexpensive optical sensors, and mechanical devices not specifically designed for image scanning purposes.

SUMMARY OF THE INVENTION

The present invention provides a method for acquiring data from an image contained on a medium mounted in a paper feed mechanism of a printer having means for indexing the feed mechanism to displace the medium transversely relative to a print head platform that is displaced laterally relative to said paper feed mechanism. The platform has print head mounting means for mounting a print head having a plurality of vertically displaced, individually actuatable print pins. The printer also has ribbon cartridge mounting means for mounting a cartridge having a ribbon operatively associated with said pins whereby indicia can be deposited on said medium in response to displacement of said platform and actuation of said pins. The method comprises mounting an optical sensor on one of said mounting means for reviewing said medium and producing an output signal, representative of the optical density of the viewed medium, in response to displacement of said platform. The output of the optical scanner is stored as the platform is repeatedly displaced in synchronism with repeated indexing of the paper feed mechanism In one embodiment of the invention, the sensor is connected to the print head mounting means in place of said print head. In another embodiment, the sensor is connected to the print head which, itself, is mounted on the print head mounting means. In still a further embodiment, the sensor is connected to the ribbon cartridge which, itself, is mounted on said print head mounting means.

The invention also involves correlating the output of said sensor with the lateral position of said platform. One way to achieve this is to sample the output of the sensor in synchronism with the printer strobe commands by which the pins of said print head are actuated when the latter is in normal use.

As the optical sensor traverses the image, each strobe command causes a sampling of the optical intensity level to be made until a predetermined number of readings have been made corresponding to the width of the image. The optical level associated with each reading is processed depending on whether the image is of the line or photographic type. The processed level can be stored in a buffer which can be equivalent in width to the image width.

The buffer can be a memory array n bits high by m bits wide. The height of the array is a predetermined value corresponding to the height of the dot-matrix printhead. During the first pass of the optical sensor, the first row of the array is loaded. The mechanism is then caused to move the image the equivalent of one vertical dot in height. Each subsequent pass of the sensor loads a corresponding row until the n rows are filled. A this point, the data contained in the memory array is compressed depending on whether the printer has "graphics tab", "repeat character", or other character skipping control features. Following this, the data contained in the memory array can be sent to the host computer for storage or to a data transmission device such as a modem. The array is sent by outputting each column of n-bits in either serial or parallel form. After the m-th bit is sent, a control sequence is sent which corresponds to a line feed for the printer.

In the line copy or binary mode of operation, the optical level is sensed to determine if the image read by the sensor is either black or white. This is a binary decision process causing either a data bit 1 or data bit 0 to be loaded into the array at point n, m.

In such case, data stored in the nxm memory array are said to constitute a bit-mapped representation of the scanned image. That is to say, the contents at location n, m in the memory array has a value "1" or "0" depending on whether a line exists or does not exist at the image location corresponding to location n, m in memory.

In the photographic mode, the optical level is sensed. Its value corresponds to the grayness of the image in the sensed area. Any number of gray levels can be processed. For each gray level, a look-up table can be provided which consists of a specific configuration of dots. This dot pattern is loaded into the memory array.

In this case, the data stored in the n×m memory array are said to constitute grey-scale mapped representation of the scanned image. That is to say, the contents at location n, m in the memory array has a value between "N" and "0" allowing the stored image to have N+1 grey levels.

In the photographic or gray-scale mode, the reproduced image can have a data density which is greater than the sampling density where the sampling density is defined as the spacing between samplings of the original image. Thus, for each sampled pixel, more than one pixel space is allocated in the reproduced image. In other words, the associated pixel in the reproduced image is larger than its associated pixel in the original image. The distribution of dots within the various pixel spaces contained in the reproduced image provides gray-scale resolution. This distribution pattern can vary in accordance with the sensed optical intensity level of the corresponding original image pixel.

Alternatively, a gray-scale mode can be provided by varying the optical intensity of a single dot produced by an ink jet or other printer. In such systems, the sizes of the original pixels and the corresponding reproduced pixels will be substantially equal, just as with a binary mode as previously described.

BRIEF DESCRIPTION OF THE DRAWINGS

The above and other objects, features and advantages of the present invention will be more fully apparent to those of ordinary skill in the art to which this invention pertains from the following detailed description when considered in conjunction with the accompanying drawings in which like reference characters designate like or corresponding parts throughout the several views and wherein.

DETAILED DESCRIPTION OF THE PREFERRED EMBODIMENT

Figure 1:
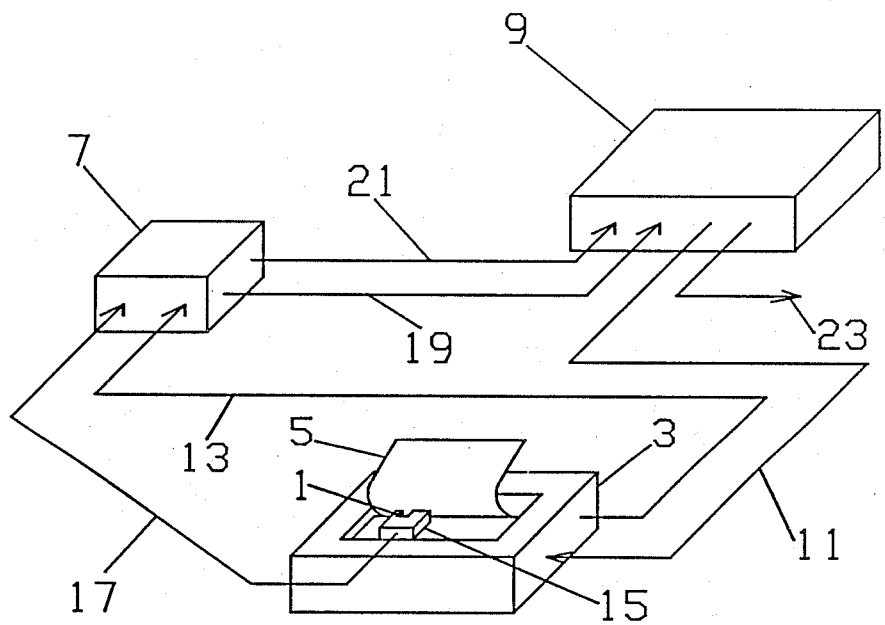
FIG. 1 is a perspective view of a system incorporating features of the invention.

FIG. 1 shows the relationship of optical sensor 1, image-bearing medium 5, and printer 3. Signal processing electronics 7 and computer 9 are also shown. In normal operation, computer 9 uses printer 3 as an output device for the listing of information or the printing of graphics. The data for this purpose is sent to printer 3 over cable 11 as either serial or parallel data. The printer is modified to access the printhead strobe command which is sent over cable 13 to signal processing unit 7. The printhead strobe command is a signal internal to the printer and is well known in the art.

When it is desired to use the image scanning function, the user places the optical sensor 1 on printhead platform 15. The optical sensor data resulting from sensing the intensity of pixels of image-bearing medium 105 is sent to signal processing unit 7 over cable 17. The user places image-bearing medium 5 which can consist of any graphic material into the printer paper feed mechanism and sets the printhead platform 15 to the upper left corner of the image-bearing medium 5.

Computer 9 contains a program or set of instructions which requests the user to specify the image width, height, and copy mode. The computer 9 then begins to control the data acquisition process.

Printer 3 is issued a sequence of commands over cable 11 which cause printhead 5 to make one horizontal pass across image-bearing medium 5. During this pass, the printer issues a strobe command for each print dot location. However, the command sequence is made to consist of blank characters and the printhead performs the "not print" function. The strobe commands are detected in the signal processing unit 7 from cable 13 and sent to computer 9 as an interrupt command over cable 19.

Simultaneously with each strobe command, optical sensor 1 is caused to read the image intensity to send proportional voltage levels to signal processing unit 7 over cable 17. Signal processing unit 7 converts these voltage levels into digital data and sends this data to the computer over cable 21.

Computer 9, upon receipt of each interrupt signal from cable 19 processes the digitized optical sensor data from cable 21 and loads this data into a temporary storage area of memory. When sufficient data has been collected by computer 9, the data is sent out to either a permanent storage device or a data transmission device over cable 23.

Signal processing unit 7 may be built as a stand-alone unit as shown in FIG. 1 or it may be built into the printer housing 3 as an integral part thereof. Optical sensor 1 can be placed into position on the printhead 15 when the user desires the image processing function or it can be permanently built into printhead 15.

Figure 2:
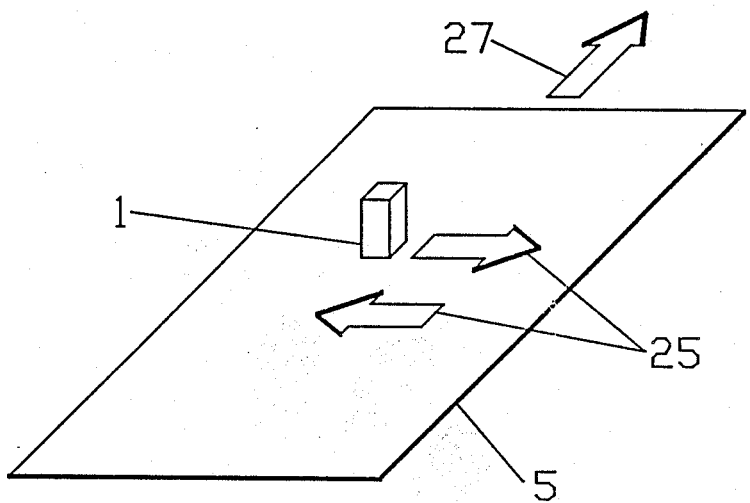
FIG. 2 is a perspective view illustrating the movement of the scan head with respect to the image.

FIG. 2 illustrates the arrangement of optical sensor 1 with respect to an image-bearing medium 5 contained in the print feed mechanism of a dot-matrix printer. The mechanisms for moving optical sensor 1 and image-bearing medium 5 are not illustrated. Such drive means are well known in the art.

Optical sensor 1 is moved linearly across the medium 5 by the action of the dot-matrix printhead platform. This motion, illustrated by arrows 25, is caused by a sequence of commands sent to the printer. The sequence of commands is well known in the art. The width of the motion is predetermined and can be controlled by the sequence of commands. When the printhead reaches its terminal velocity, circuitry (not shown) in the dot-matrix printer begins to issue strobe commands corresponding to each print location. However, because the sequence of commands can be formatted to be blank characters, there will be no printing. The motion 25 can be either unidirectional or bidirectional depending on the characteristics of the printer used as the platform. As illustrated in FIG. 2, bidirectional motion is shown. For a unidirectional printer the motion arrows 25 would all point from left to right.

The dot-matrix printhead consists of an array of mechanisms. These consist of solenoid driven wires, or ink jets, or light sources arranged in a vertical array n-high. In the alphanumeric mode, these printers use all n elements for the printing of characters. In the graphics mode, all or some elements are used. A typical value used is six. Thus, when the printer is printing a sequence of graphic commands, six bits of data are fed to the six printing mechanisms in a one-to-one relationship. The result of this action is that in one pass of the printhead, columns of up to six dots can be printed across the page. The printhead in such printers moves across a page in continuous linear motion while printing, stopping occurring only when lines are changed.

It is required that the single optical sensor 1 make n passes across the image-bearing medium 5 in order to collect the data required for the n print elements of the printhead to print the data in one pass. Thus, during each single pass of optical sensor 1, medium 5 is incremented in the direction of the arrow 27 the equivalent of the height of one print element.

Figure 3:
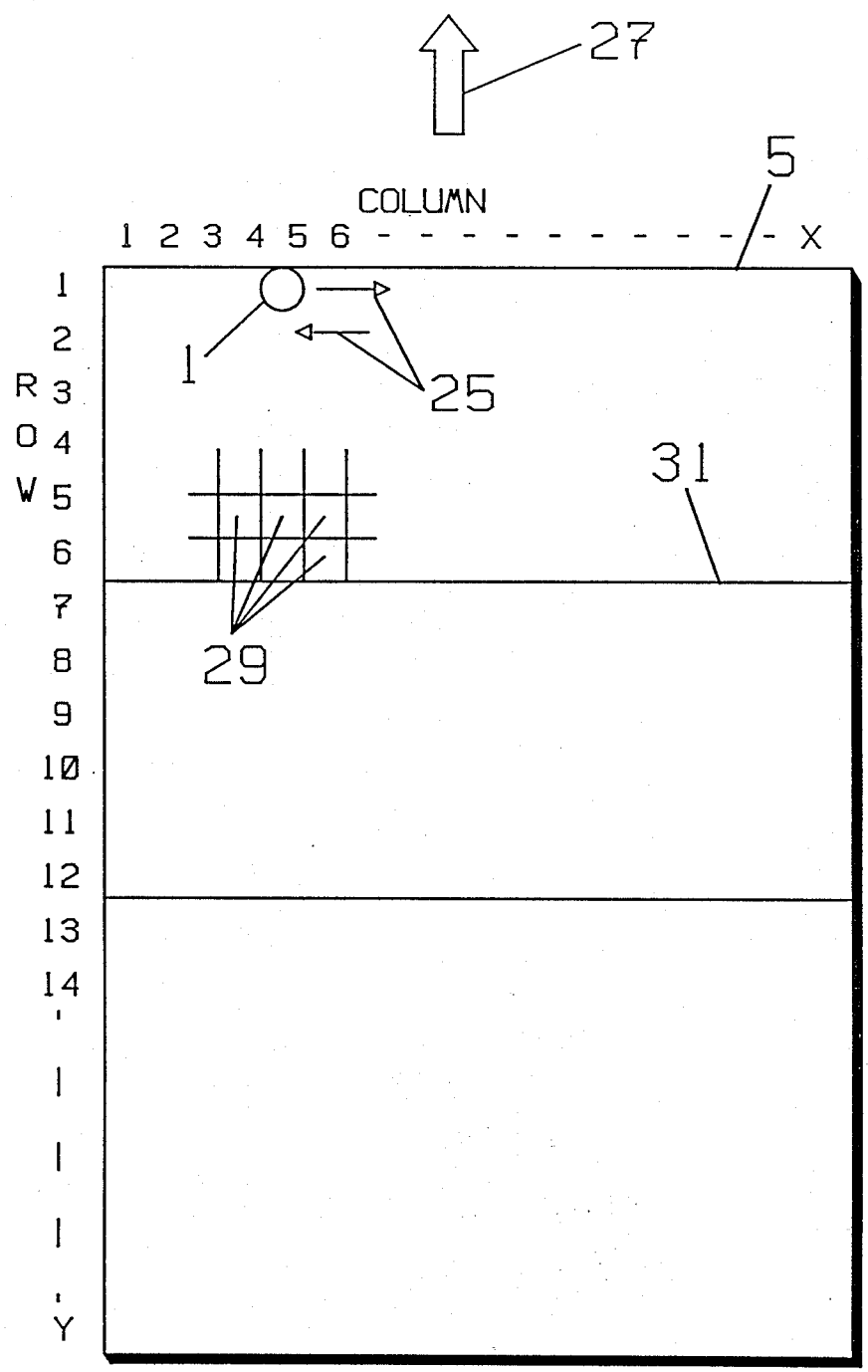
FIG. 3 is a plan view of the image being scanned showing the relationship of the pixels and the movement of the scan head.

FIG. 3 is a plan view of the image to be scanned and shows optical sensor 1 capable of moving in either direction 25 across the medium 5 with the advancement of the medium in the direction of arrow 27. FIG. 3 also shows the arrangement of pixels 29 with x pixels across medium 5 and y pixels down medium 5. Dividing line 31 shows the boundary where, after n passes of optical sensor 1 have been made, sufficient data has been collected for printing. In FIG. 3, boundary line 31 occurs after six passes of optical sensor 1.

In a typical case, dot-matrix printers print 72 dots per inch across the page and 72 dots per inch down the page. For an 8 inch by 10 inch image this corresponds to 414,720 pixels. This data can be stored in bytes where eight bits equal one byte. Because some printers use six bits for one graphics print command, six pixels can be converted to form one byte of information for storage. As a result, the 414,720 pixels can be stored as 69,120 bytes of data. The image can be stored in the computer random access memory (RAM) or in a file space such as is available with disk or tape storage devices. However, an intermediate buffer or memory working space is required to temporarily store the data from each of the n passes of the optical sensor.

Figure 4:
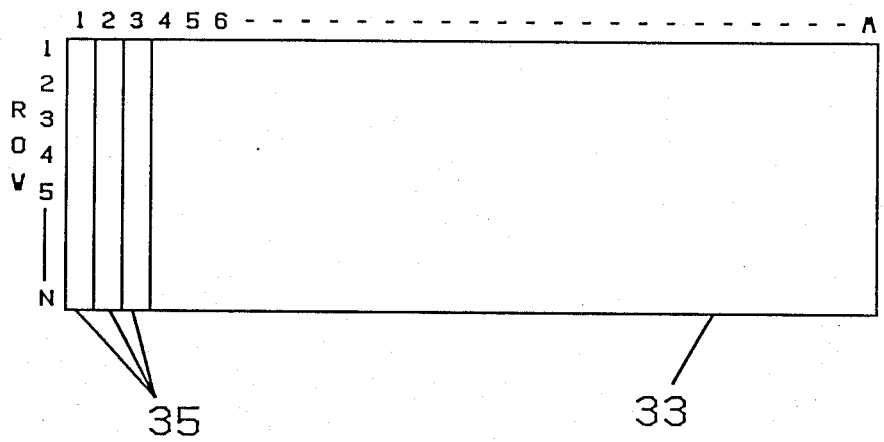
FIG. 4 is a diagram of the memory buffer array.

FIG. 4 shows memory buffer 33. This is used to temporarily store the data gathered by each pass of optical sensor 1. The width x of this buffer must equal the number of dots per inch in the horizontal direction times the maximum image width. For dot-matrix printers with graphics printheads of eight or less print elements, the buffer will be equal to the previously calculated width in bytes 35. Memory Buffer 33 can be made by allocating a workspace in the computer. The buffer locations are filled with pixel data in direct correspondence to the manner in which the data is collected During the first pass of optical sensor 1 across the image, row 1 of the buffer is loaded. During the second pass, row 2 is loaded. This process continues until the required number of passes is made to fill the buffer. At that point, the buffer will be filled to the extent corresponding to the height of the printhead. Because there is a one-to-one correspondence between the collected data and the print elements of the printhead, the data can be sent directly to a printer, or to a modem for data transmission, or to the computer for storage. This is done by pointing to the first data byte in buffer 33 and clocking this byte out either as serial data bits or as eight bits of parallel data. After the last byte of data is sent, a command is also sent. This command corresponds to a printer paper feed equivalent to the height of the graphics printhead.

The process of moving the optical sensor across the image is repeated in groups until the entire image is completed.

Figure 5:
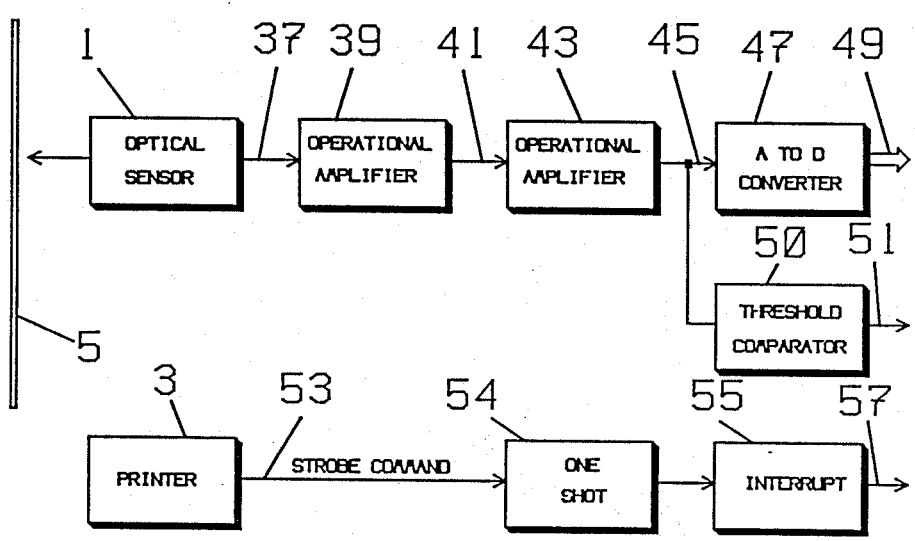
FIG. 5 is a block diagram illustrating the circuit diagram of the invention.

FIG. 5 is a block diagram showing circuitry for collecting the data, setting image intensity levels, converting the data to a form usable by the controlling computer, and accepting and buffering the strobe commands. The controlling computer coordinates the operation of the printer, the acceptance and processing of the data, and either the storage or transmission of the data. The functioning of the controlling computer is identical to that of a controlling microprocessor.

Referring to FIG. 5, optical sensor 1 senses the pixel area on the image 5 and sends the analog signal data to operational amplifier 39 over line 37. The voltage level on line 37 could be a maximum for a white image and a minimum for a black image or vice versa depending on the type of optical sensor used. The operational amplifier 39 is used to adjust the voltage on line 37 for the whitest image area. An operational amplifier 43 used to adjust the voltage on line 45 for the blackest portion of the image. The voltage levels on line 45 will then encompass the full range of values required for the analog-to-digital signal conversion performed by analog-to-digital converter 47. The selection of the bandwidth of operational amplifiers 39 and 43 is based on the rate of change of signals from optical sensor 1. The computation is well known in the art. The selection of the speed of the analog-to-digital converter 47 is based on the time required between successive data samples allowing for computer processing time. This calculation requires knowledge of the central processing unit (CPU) speed and the length of computer code and is well known in the art. The selection of the number of bits 49 of accuracy depends directly on the number of gray levels required for photographic imagery. A threshold comparator 50 is used for line imagery where only black/white decisions are required. The binary output 51 consists of either a data bit 0 for a black image or a data bit 1 for a white image. Dot-matrix printer 3 issues a strobe command along line 53. It may also be called a print command depending on the printer manufacturer. This command on line 53 is sent to a one-shot 55 to permit the setting of the command width to be compatible to the computer or microprocessor interrupt circuit 55. The width must be long enough to insure triggering of the computer or microprocessor but less than the tip of the next strobe command.

Figure 6A:
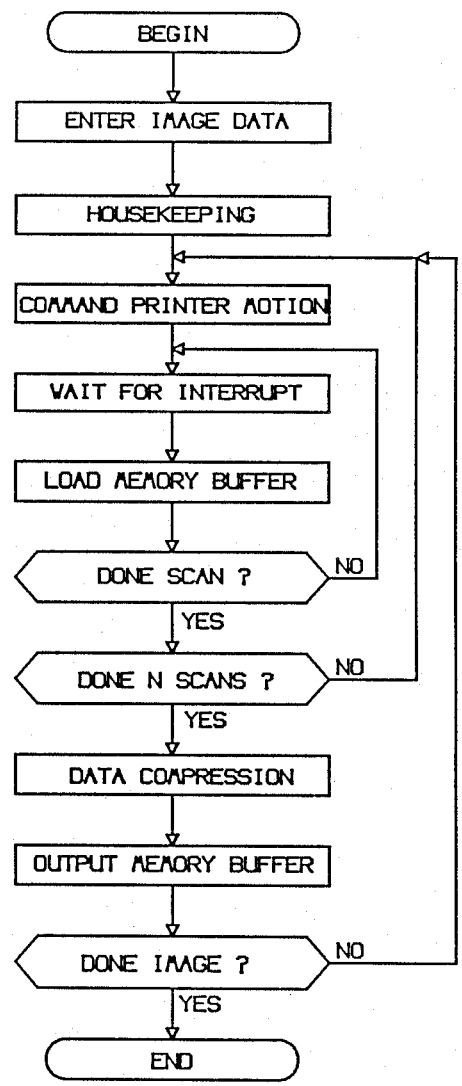
FIG. 6a and is an overall flow chart for the control of the processing.

FIG. 6a shows the overall flow chart for the computer or microprocessor program. The program can be coded in any language which will permit the operation to be made with sufficient speed so that the dta from each reading will be processed.

There are three entries that the program uses to establish the operational criterion for the acquisition of the image. These are the height, width, and mode. This data is called for in the step called Enter Image Data. The height and width may be specified in any units and converted to the number base of the computer. The mode is entered as either the line or photographic mode. This specified mode can be used to set a flag condition. Housekeeping is used to set up a memory buffer work space depending on the image width, initialize counters, and to set up a command sequence for the printer. The user may also establish a choice for either the permanent storage of image data such as a disk file or the direct transmission of the data to a modem or other printer.

With the optical sensor mounted on the printhead or other moving platform, the user physically moves the platform and/or image so that the sensor is at the starting point. This could be the upper left corner. Of course, this setting of the sensor could alternatively be accomplished automatically by appropriate electronic circuitry or other means readily within the capability of one of ordinary skill in the art.

Command Printer Motion calls for reading the command sequence and sending it to the printer. This causes printer 3 to move the printhead one scan or pass across the image 5 and to move the image 5 up one dot height at the end of the printhead travel. The printer mechanism, in response to the command sequence will issue the strobe command along line 53 as shown in FIG. 5 as the printhead moves across each pixel in the image-bearing medium 5.

After the computer issues the command sequence, it is placed in an idle loop as specified by Wait For Interrupt. The interrupt command along line 57 as shown in FIG. 5 informs the computer 9 that the optical sensor 1 is currently crossing through a pixel and that data is available for reading. The data is available from the output of the analog-to-digital converter 47 or the threshold comparator 50. The selection of which input lines 49 or 51 can be based on the flag allocated during the selection of the mode. The receipt of the interrupt command along line 57 causes the computer 9 to perform the step—Load Memory Buffer—in a process detailed below. When the data for the pixel has been loaded, the computer checks to determine if all of the pixels from the first scan have been read. If not, the computer returns to Wait For Interrupt. If all readings have been made, the computer checks to determine if the required number of scans have been made. If not, the computer returns to Command Printer Motion. If all scans have been made, the computer memory buffer has been filled with a sequence of graphic data bytes equivalent to the corresponding scanned pixels.

Figure 7:
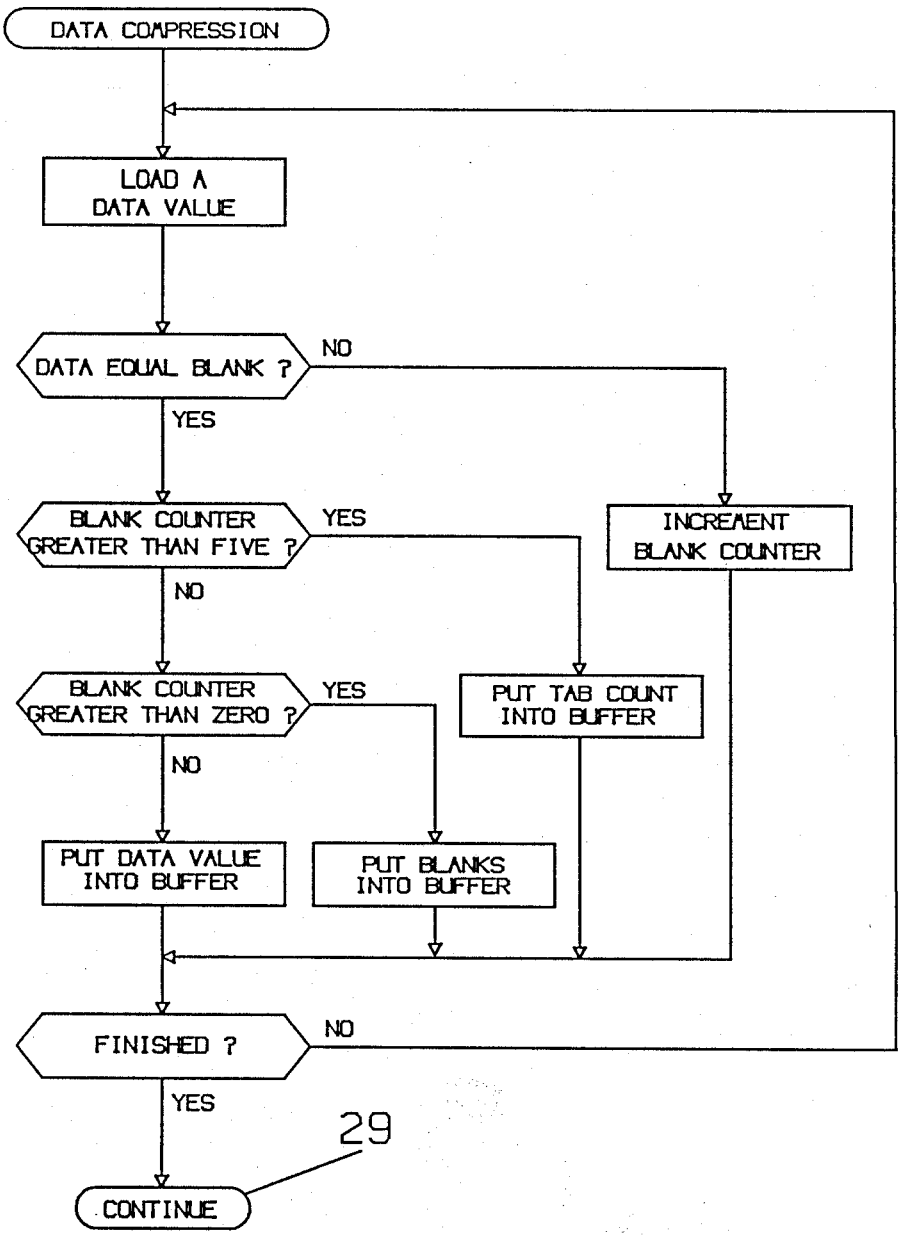
FIG. 7 is a flow chart for the data compression routine.

A data compression routine is shown in FIG. 7 for printers with special character control features. This routine reduces the amount of data stored in the buffer and, consequently, the file space or transmission time requirements. The routine is described in detail below.

Referring again to FIG. 6a, the contents of memory buffer 33 are then sent out to the previously specified storage of data transmission medium in the Output Memory Buffer routine. Upon completion, the computer also sends a command sequence which is equivalent to an n-dot vertical move for a printer. This is to insure that, after that data is printed, the printer is incremented vertically to be ready for the next data sequence. After the Output Memory Buffer function, the computer checks to determine if the entire image has been scanned. If not, the computer returns to Command Printer Motion.

Figure 6B:
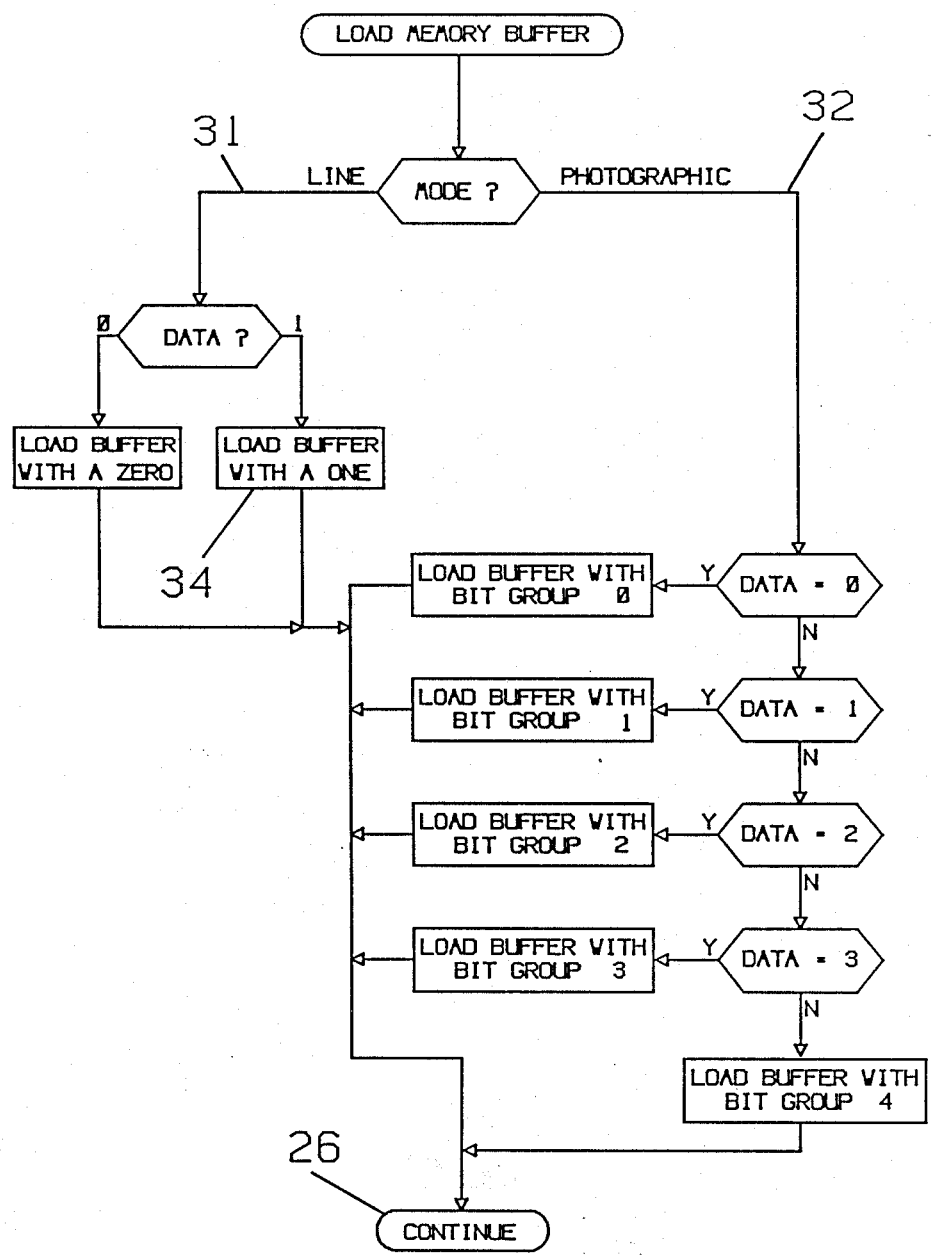
FIG. 6b is a flow chart for loading the memory buffer.

FIG. 6b shows the program flow for the Load Memory Buffer function for both the line and photographic modes. Upon receipt of the interrupt command 57, the computer checks to determine whether the line mode or photographic mode has been selected. In the line mode, the data from the threshold comparator 50 is read in. If the data is a 0 bit, the computer selects the column C corresponding to the appropriate pixel that the optical sensor 1 is passing over in conjunction with the row R corresponding to the n-th scan, and loads the memory buffer 33 at that point with a data bit 0. Similarly, if the data is a 1 bit, the same process occurs with the exception that a data bit 1 is loaded.

If the photographic mode has been selected, the data from the analog-to-digital converter 47 is read in. The value of this data corresponds directly to the tonal shade ranging from black to white within the pixels. In the following example, a gray scale of five levels is shown. However, any number of gray levels could be used depending on the accuracy of the analog-to-digital converter and the computer's ability to accept and process the data within the constraint of the processing speed.

Figure 6C:
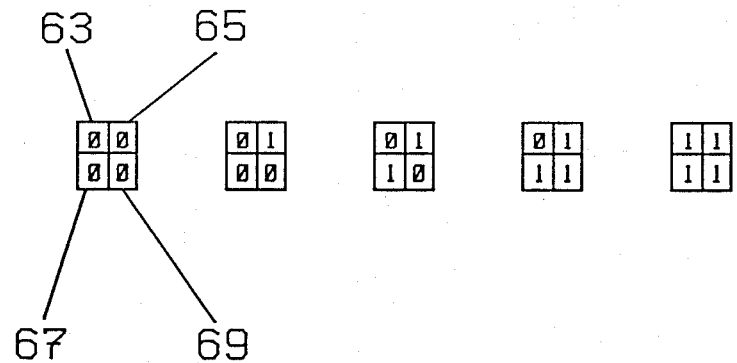
FIGS. 6c and 6d show the gray-scale bit patterns for 2-by-2 and 3-by-3 arrays.

FIG. 6c shows a representation of five gray levels ranging from white in bit distribution pattern 0 to black in bit distribution pattern 4. Each bit distribution pattern consists of data bits 0 or 1 as shown. The tonal value in each sampled pixel is converted to one of the five bit patterns depending on the value at line 49. Because most dot-matrix printers cannot control the intensity of the printed dot, these bit patterns provide a direct correspondence by virtue of the quantity and distribution of dots printed. For printers where dot intensity, often called Z-axis modulation, is featured, these bit patterns are translated into intensity control. In the example shown in FIG. 5c, each bit pattern is stored in a two by two bit location in the computer. The selected pattern is loaded into the memory buffer depending on the value at line 40.

Figure 6D:
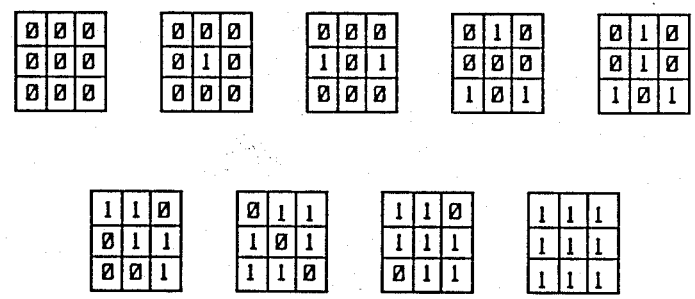

FIG. 6d shows a representation of ten gray levels using a 3-by-3 bit array.

In FIG. 6b at line 61, the value at line 49 is checked to determine if it is a 0. This could correspond to white. If it is, the computer selects bit distribution pattern 0 shown in FIGS. 5, 6c and 6d and loads this pattern into the memory buffer. This is done by ascertaining the current row-column relationship as previously noted in describing the functioning of the line mode. This determines the starting point for the memory loading. In order to load the bit group, four operations are required. This is shown in FIG. 5c. The first bit 63 of bit pattern 0 is selected. This bit is loaded into the memory buffer at row R and column C. Then the second bit 65 is loaded into the memory buffer at row R column C+1. The third bit 67 is loaded into row R+1 column C and the fourth bit 69 into row R+1 column C+1.

Because, in the case of a five level gray scale, four locations of the memory buffer have been used, the counter controlling the loading of the buffer must be incremented by two each time. In addition, the number of scans must be reduced by n/2. Finally, alternate readings of the Wait For Interrupt must be skipped.

Returning again to FIG. 6b, for the case of photographic mode, the process as described above continues such that if the value at line 49 was not a 0, line 49 is checked until the value is determined. At the completion of either the load buffer sequence for the line mode or the photographic mode, the processing continues at the Done Scan step as shown in FIG. 5a.

In the photographic mode wherein gray scales are used, there are several methods that can be used to provide image reproductions or representations. In the process detailed above in connection with FIGS. 5c and 5d, a five-level gray scale requires the establishment of five bit or dot distribution patterns. There is a one-to-one correspondence between the gray scale level and the number of bit patterns. When bit distribution patterns are used, instead of controlling dot intensity, the patterns are designed to appear random and at the same time to appear to represent a good tonal scale when printed FIG. 5d shows bit patterns for a nine-level gray scale. In this case, it can be seen that the patterns are made of a three-by-three dot array. A four-by-four dot array yields a gray scale of seventeen and so on. There are specific tradeoffs that are required in the specification of the gray scale. These include the memory buffer size and the image resolution. If the number of bytes in the memory buffer is made identical to the image width in dots, then either the maximum scan width for the image must be reduced by the bit pattern array size or the resolution must be reduced by skipping pixel readings by the same amount.

FIG. 7 shows the flow chart for the data compression routine. The use of this routine is dependent on whether the printer has certain control features in the graphics mode. Two features well known in the art include tab and repeat characters. In concept, the memory array 33, when loaded with data, contains bytes which conform to the standard ASCII characters. For example, a byte value in decimal of 64 prints as a "@". In the graphics mode of a printer such as the ANADEX 9501, the byte value of decimal 64 prints as a "blank" or a space. Many graphics images consist of wide arrays of white space or blank areas. When these areas are optically scanned and loaded into the memory buffer using the previously specified process, the memory array may contain sequences of identical characters. Rather than store this repetitive information, a count of the repetitive data can be established and this count stored instead. This is the nature of the data compression routine and is described as follows.

The first data byte in the memory array 33 is loaded into a temporary storage area. The byte is compared to any data value which may be a repetitive one. In this case, the data byte is being compared to a 64 or "blank". If the data byte is a blank, the blank counter (not shown) is incremented at the step called Increment Blank Counter. If the data byte is not a blank, the blank counter is tested to determine if it is greater than five. The actual number depends on the printer. In this case, it takes five control characters to generate a "tab" value. As a result, there is no compression when there is a sequence of five or less "blanks". If the blank counter is greater than five, the actual count of the blank counter is placed into the memory buffer 33 instead of the data. If the count is less than five, the blank counter is tested to determine if the count is greater than 0. If it is, that number of "blanks" are returned to the memory buffer 33. If not, the actual data value, a single byte, is returned to memory buffer 33. Memory buffer 33 is tested to determine if the entire buffer has been examined. If not, the process continues at Load a Data Value. If the memory buffer 33 has been completely examined, the process is complete and the Output Memory Buffer routine follows.

Figure 8:
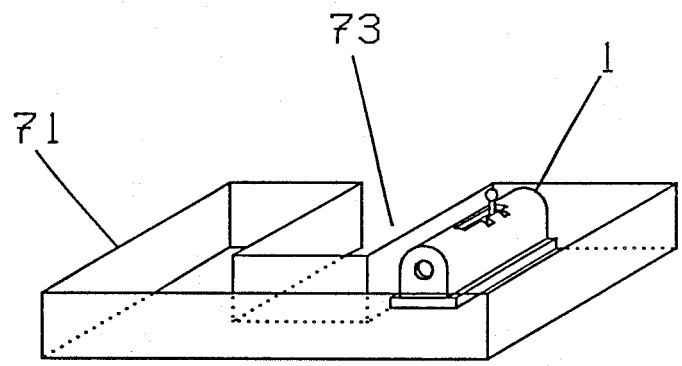
FIG. 8 is an isometric view of the mounting of the optical sensor to a printer platform.

Referring now to FIG. 8, the optical sensor 1 may be mounted to a printer platform either permanently or as an adapter.

The preferred method for adapting the optical sensor 1 to the printhead is shown in FIG. 8. The case 71 is identical to a printhead ribbon cartridge, well known in the art, for holding the printer ribbon in position. Ribbon cartridges are manufactured in a variety of configurations which encompass various shapes and mounting provisions. The objective here is to show that the cartridge housing can be used, with the ribbon and attendant parts removed, to mount the optical sensor 1. The sensor can be affixed to a location to the left or right of the printhead region 73. The ribbon cartridge cover is not illustrated. The advantage of this method is that the optical sensor mass is approximately the same as that of the ribbon. With the ribbon removed, the total mass of the printhead is not disturbed. Another advantage is that the optical sensor 1 is located in horizontal alignment with the printhead such that the sensor 1 is disposed perpendicularly to the image surface in the same manner that the printhead requires.

Figure 9:
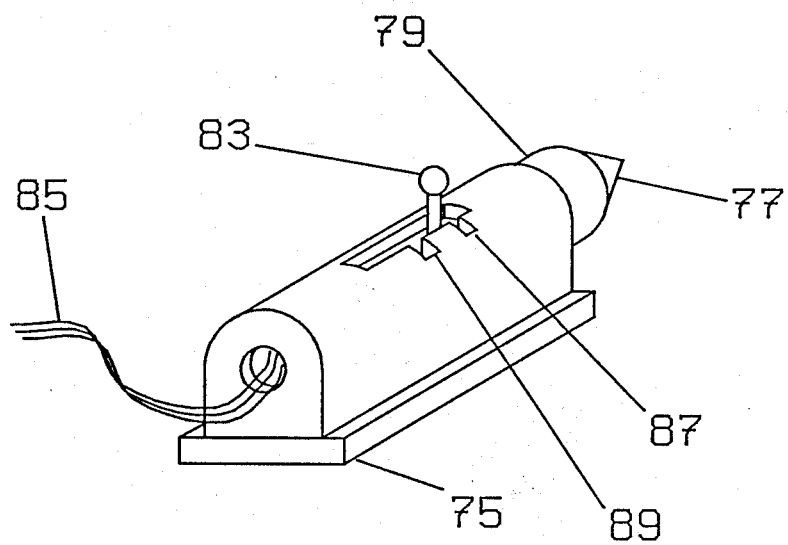
FIG. 9 is a plan view of the optical sensor mechanical mounting.

FIG. 9 shows details of the mechanical mount 75 of optical sensor 1. Mount 75 is formed by optical sensor 1, positioning extension 77, concentric sliding tube 79, a spring 81, lever 83, and sensor cable 85. In practice, when mounted, mount 75 insures that optical sensor 1 is maintained at a fixed distance from the image 5 surface independent of variations in the printhead-to-image distance. This is caused by the action of the spring 81 forcing the concentric sliding tube 79 and attendant parts against the image surface. The image surface-to-optical sensor distance is fixed by the length of the positioning extension 77. This configuration is possible with the lever 83 in position 87 as shown in FIG. 9.

Figure 10:
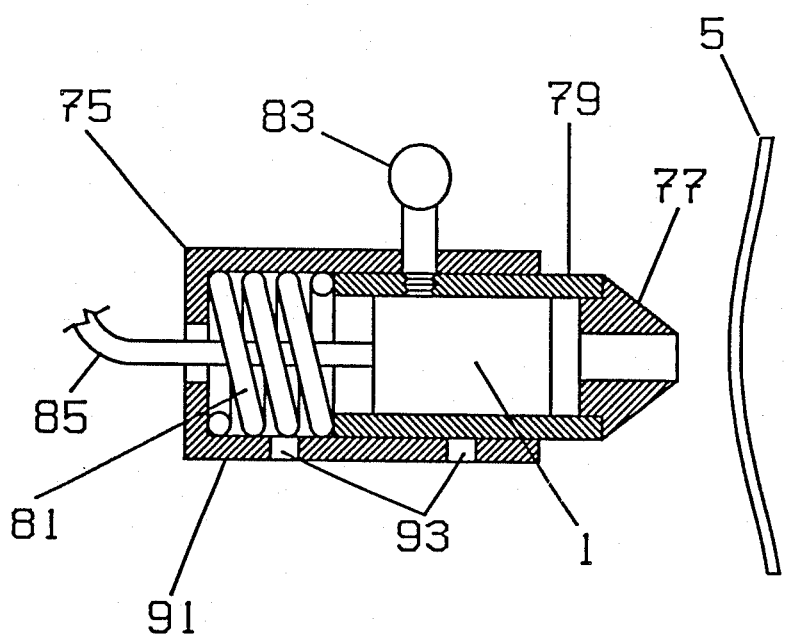
FIG. 10 is a sectional view of the optical sensor mechanical mounting shown in FIG. 9.

In some cases, the aforementioned configuration might bind if the travel length of the printhead extends beyond either side of the image surface. FIG. 10 shows lever position 87 which locks the optical sensor into a fixed position so that positioning extension 77 does not contact the image 5 surface. Positioning extension 77 is removable by the user. Lever position 89 is used to fully retract positioning extension 77 for the purpose of enabling the images into the printer without causing binding against positioning extension 77.

Mount 75 is located within case 71 as shown in FIG. 8. It can be affixed to the case 71 using glue on the bottom surface 91 or via bolt holes 93. Alternatively, mount 75 can be adapted to the printhead, without the use of the case, using VELCRO fastening techniques. This is done by selecting a flat area approximating the size of mount 75 near the printhead. Mount 75 can be permanently built into the printhead.

Figure 11:
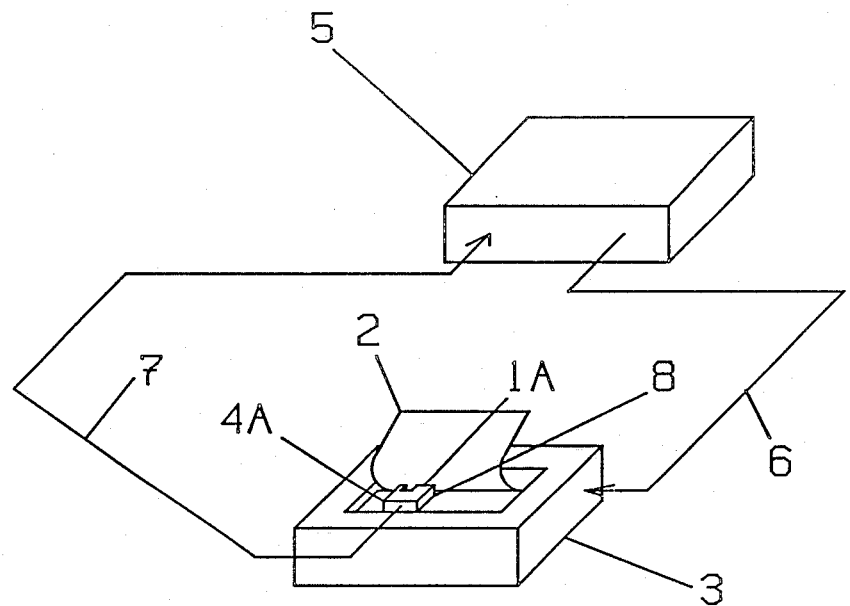
FIG. 11 is a perspective view of another embodiment of the present invention.

In the embodiment shown in FIG. 11, optical sensor 1A is contained in cartridge 4A (see FIG. 13), in operative relationship to image-bearing medium 2 mounted on a paper feed mechanism contained in printer 3. The output signal from the sensor is processed by signal processing electronics 4 and computer 5. In normal operation, computer 5 uses printer 3 as an output device for the listing of information or the printing of graphics. Data for this purpose are sent to the printer over cable 6 in either serial or parallel form. The printer may be modified to permit optical data cable 7 to exit from the printer. The modification may require merely the opening or removal of the the printer cover.

In order to convert the printer from a printing mode, to an optical scanning mode, the user mounts optical sensor 1A on printhead platform 8. This can be done either by mounting the sensor in a casing similar, or identical, to a ribbon cartridge for the printer, or by securing the optical sensor directly to the printhead. The method shown in FIGS. 11 and 13 uses a ribbon cartridge mounting.

Image bearing medium 2 is loaded into the printer using the method the printer uses to transport blank paper. For example, if the printer has a friction feed platen, the image bearing medium is rolled into the printer using the platen. If the printer uses a tractor feed, the user may tape or glue the image to the tractor feed type of blank printer paper. Or, a tractor feed adapter can be used to permit the loading of single sheets of paper into printers which have only tractor feed mechanisms.

Computer 5 contains a program or set of instructions which requests the user to specify image width, height, resolution, and copy mode. The computer 5 then begins to control the image data acquisition process. First, the computer issues the printer a sequence of commands over cable 6 which cause printhead platform 8 to make one horizontal pass across image bearing medium 2. Optical sensor 1 scans a line of picture elements (pixels) on the image bearing medium carried by the paper feed mechanism producing an output signal whose level, at any instant, is proportional to the light intensity of the pixel viewed by the sensor at that instant. The sensor signal may be digitized in signal processing unit electronics 4A; or digitization can be done by the computer.

The processed optical signal, which can be in either digital or analog form depending on the type of input circuit of the computer, is sent to the computer over cable 7. At the end of a horizontal pass by the sensor, computer 5 processes the optical signal data and displays the image on the computer display and/or stores the image data in a storage medium associated with the computer 5. The computer 5 sends printer 3 a command to move the image bearing medium 2 vertically. The amount of vertical movement will depend on the resolution selected by the user.

Figure 12:
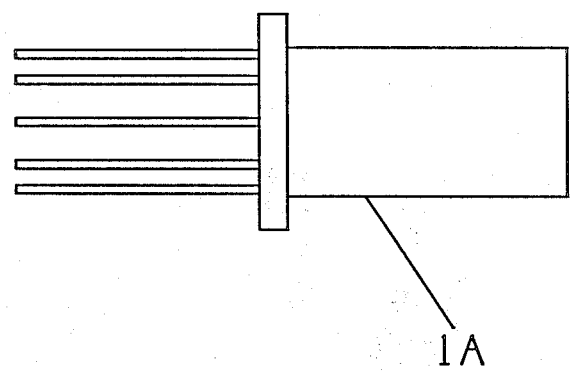
FIG. 12 is a plan view of the optical sensor in the embodiment of FIG. 11.

FIG. 12 illustrates a suitable optical sensor which is currently for sale by the Hewlett-Packard Company under the name "High Resolution Optical Reflective Sensor." The part number is HEDS-1000. The manufacturer's description and applications make no mention of use of this device as an optical sensor in a scanning application for the purpose of image data acquisition. Specifically, the manufacturer's recommended applications include pattern recognition and verification, object sizing, optical limit switching, tachometry, textile thread counting and defect detection, dimensional monitoring, line locating, mark, and bar code scanning, and paper edge detection.

Figure 13:
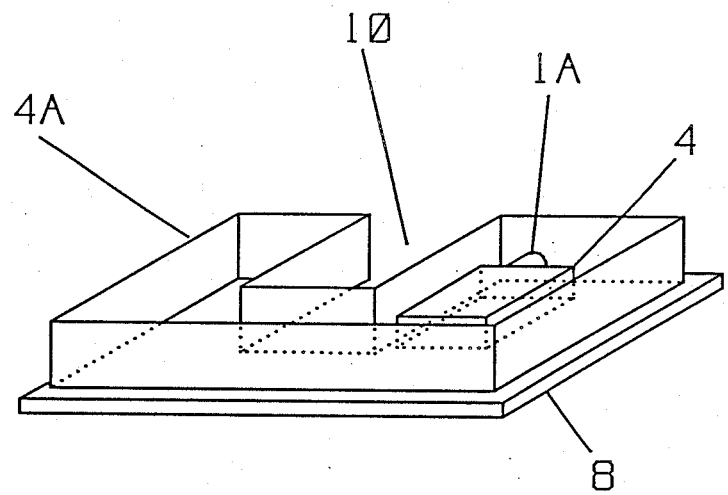
FIG. 13 is a perspective view of a method of connecting the optical sensor to a printer platform using the location of the ribbon cartridge.

FIG. 13 shows a method for mounting optical sensor IA to the printhead platform 8. An example of a printer which can use this type of mounting is the Anadex 9501. Case 8 is a printhead ribbon cartridge, well known in the art, for holding the printer ribbon in operative position relative to the print head of the printer. Ribbon cartridges are manufactured in a variety of configurations which encompass various shapes and mounting provisions. The objective here is to show that the cartridge housing can be used, with the ribbon and attendant parts removed, to mount optical sensor 1A. Signal processing unit electronics 4A can also be mounted in case 5. The optical sensor 1A is located either to the left or right of space 10, which accomodates the printhead (not shown), depending on the symmetry of cartridge construction.

Optical sensor 1A can be fixed to the cartridge, or it can be removeably mounted thereon. The method employed depends on the degree of focusing required, which, in turn, depends on the separation of optical sensor 1A to the image bearing medium. Some printers locate the printhead and ribbon cartridge on a mount which can be adjusted so as to cause the printhead-to-paper distance to vary depending on the print darkness required by the user. In this case, the user can focus the optical sensor by moving the print impression lever.

In cases where the print impression lever does not have sufficient range or does not exist, the optical sensor may be mounted within the ribbon cartridge in a manner to permit the optical sensor to image bearing medium distance to be adjusted. One method for this purpose is to locate the optical sensor on a sliding mount (not shown) provided with a threaded screw. Turning the screw moves the sliding mount in or out depending on screw rotation. Other expedients could also be used.

Figure 14:
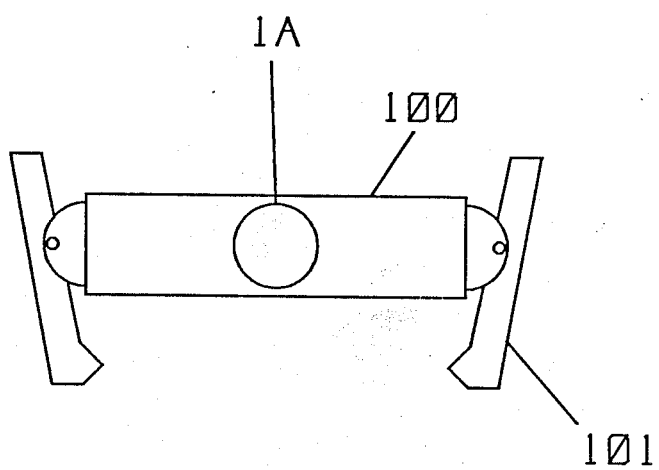
FIG. 14 is a perspective view of a method of connecting the optical sensor to a printer platform using the print head as the mount.

FIG. 14 shows a method for mounting the optical sensor to a printhead platform in the case of a printer where the ribbon cartridge does not move with the print head. An example of a printer with this type of mechanism is the Epson MX-80. In this case, the optical sensor must be mounted to the printhead or to the platform on which the printhead is mounted. FIG. 14 shows the design for mounting the optical sensor directly above the printhead. Clamp 100, having a pair of resiliently biased arms 101, permit the sensor to be snapped onto the printhead. Suction cups are also suitable for attaching the optical sensor to printheads that have a flat surface. Or, preformed metal straps with spring tension achieved by the resilient nature of the straps can be used to grip the print head. The optical sensor mounting can also be glued to the printer. In this case, cable 7 can be detachably connected to the cartridge using a connector.

From the foregoing description, one skilled in the art can easily ascertain the essential characteristics of this invention and, without departing from the spirit and scope thereof, can make various changes and modifications of the invention to adapt it to various usages and conditions.

I claim:

1. An apparatus for opto-electrically scanning and digitizing an image on the surface of an image-bearing medium comprising:
   (a) a single sensor for sensing the optical intensity levels of the image-bearing medium, the sensor being adapted for continuous linear movement during scanning across the image-bearing medium for producing an output signal representative of the scanned image;
   (b) sampling means cooperating with the sensor for sampling its output signal at predetermined intervals of time to provide a digitized representation of the scanned image; and
   (c) means for processing the output of the sampling means into a bit-mapped representation of the scanned image.

2. The apparatus as recited in claim 1 further comprising biasing means for biasing the sensor to bear against said surface of the image-bearing medium.

3. The apparatus as recited in claim 2 wherein the biasing means includes a spring.

4. The apparatus as recited in claim 1 wherein the sensor has a focus that is preset such that said sensor is spaced a predetermined distance from the image-bearing medium.

5. Apparatus according to claim 1 including means constructed and arranged to process the bit-mapped representation for displaying the scanned image.

6. A method of generating a digitized gray-scale representation of an image using a dot-matrix printer adapted to include optical sensor for opto-electrically sensing the optical intensity level of the image comprising providing a representation of the image which has more than one pixel space for containing dots corresponding to each sensed pixel in the image whereby gray-scale resolution is provided by the distribution of dots in the representation of the image.

7. A method of generating a digitized gray-scale representation of an image using a dot-matrix printer adapted to include an optical scanner for opto-electrically scanning the optical intensity level of the image comprising providing a distribution of dots in the reproduced image for a scanned pixel in the original image where the distribution pattern of dots in the reproduced image corresponding to the original scanned pixel can vary in accordance with the sensed optical intensity level for the pixel.

8. In a dot matrix printer having a print head platform laterally displaceable relative to a paperfeed mechanism carrying an image-bearing medium, print head mounting means on the print head platform for mounting a print head with a plurality of vertically displaced, individually actuatable pins, ribbon cartridge mounting means on the print head platform, for mounting a cartridge having ribbon that is operatively associated with said pins, the improvement comprising:
  (a) a sensor for producing a signal proportional to the intensity of light received from a viewed spot;
  (b) means for connecting said sensor to the print head platform such that said sensor is responsive to the optical intensity of the image on said medium along a path viewed by the sensor when the platform is laterally displaced; and
  (c) means responsive to the signal produced by said sensor for producing a bit-mapped representation of the path viewed by the sensor.

9. The invention of claim 8 wherein said sensor is connected to said print head mounting means in place of said print head.

10. The invention of claim 8 wherein said sensor is connected to said print head which is mounted in said print head mounting means.

11. The invention of claim 8 wherein said sensor is connected to said ribbon cartridge mounting means in place of said ribbon cartridge.

12. The invention of claim 8 wherein said sensor is connected to said ribbon cartridge which is mounted in said ribbon cartridge mounting means 13. The invention of claim 8 wherein said signal has a value at a given instant which is representative of the optical intensity of a pixel viewed by the sensor at that instant.

14. The invention of claim 13 including means for storing a digital representation of the sampled outputs of said sensor at addresses corresponding to positions of the print head platform.

15. The invention of claim 14 including means responsive to said stored representation for reconstructing an image.

16. The invention of claim 8 wherein said means for connecting said sensor includes a pair of arms that releasably grip said print head when the latter is mounted on said print head mounting means.

17. The invention of claim 16 wherein said arms are resiliently biased into gripping arrangement with said print head.

18. The invention of claim 16 wherein said arms have suction cups to grip said print head.

19. A method for acquiring data from an image contained on a medium mounted in a paper feed mechanism of a printer having means for indexing the feed mechanism to displace the medium transversely relative to a print head platform that is displaced laterally relative to said paper feed mechanism, said platform having print head mounting means for mounting a print head with a plurality of vertically displaced, individually actuatable print pins, and ribbon cartridge mounting means for mounting a cartridge having a ribbon operatively associated with said pins whereby indicia can be deposited on said medium in response to displacement of said platform and actuation of said pins, said method comprising the steps of:
  (a) mounting an optical sensor on one of said mounting means for reviewing said medium and producing an output signal, representative of the optical intensity of the viewed medium, in response to displacement of said platform;
  (b) repeatedly displacing said platform and indexing said paper fed mechanism in synchronism; and
  (c) storing the output of said optical sensor.

20. A method according to claim to claim 18 including connecting said sensor to said print head mounting means in place of said print head.

21. A method according to claim 19 including connecting said sensor to said print head which, itself, is mounted on said print head mounting means.

22. A method according to claim 19 including connecting said sensor to said ribbon cartridge which, itself, is mounted on said print head mounting means.

23. A method according to claim 19 including correlating the output of said sensor with the lateral position of said platform.

24. A method according to claim 23 including sampling the output of said sensor in synchronism with the printer strobe commands by which the pins of said print head are actuated when the latter is in normal use.

25. A method according to claim 19 including the steps of processing said output signals to produce a plurality of discrete, digitized representations of the image, and storing said representations in a digital memory for producing a bit-mapped representation of the image.

26. A method according to claim 25 wherein the processing step includes periodically sampling said output signal to produce sampled signals, and digitizing said sampled signals to produce discrete digitized representations of the image.

27. A method according to claim 18 including the step of mounting said sensor on said ribbon cartridge mounting means in place of said ribbon cartridge.

28. Apparatus for use with a dot matrix printer having a print head platform laterally displaceable relative to a paperfeed mechanism carrying an image-bearing medium, print head mounting means on the print head platform for mounting a print head with a plurality of vertically displaced, individually actuatable pins, and ribbon cartridge mounting means on the print head platform for mounting a cartridge having ribbon that is operatively associated with said pin, said apparatus comprising:
  (a) a sensor mounted on the print head platform for scanning a path on said medium as said platform is laterally displaced relative to the paperfeed mechanism and producing, in response, a sensor signal proportional to the optical intensity of the medium along the scanned path;
  (b) means for sampling and digitizing said sensor signal at predetermined intervals of the time for producing a plurality of discrete, digitized representations of the image along the scanned path; and
  (c) means storing said discrete digitized representations in a digital memory for producing a bit-mapped representations of the scanned path.

29. Apparatus according to claim 28 wherein said sensor is connected to the print head.

30. Apparatus according to claim 29 wherein said sensor is mounted on a clamp having a pair of resilient, biased arms for releasably attaching the sensor to the print head.

31. Apparatus according to claim 28 wherein said sensor is mounted on a ribbon cartridge.

32. Apparatus according to claim 25 wherein said sensor is mounted on said ribbon cartridge mounting means in place of said cartridge having ribbon.

33. Apparatus comprising:
  (a) a dot matrix printer having a print head platform laterally displaceable relative to a paperfeed mechanism carrying an image-bearing medium;
  (b) said printer including printer head mounting means on the print head platform for mounting a print head with a plurality of vertically displaced, individually actuatable pins;
  (c) ribbon cartridge mounting means on the print head platform for mounting a cartridge having ribbon that is operatively associated with said pins;
  (d) a sensor mounted on the print head platform for scanning a path on said medium as the platform is laterally displaced relative to the paperfeed mechanism and producing, in response, a sensor signal proportional to the optical intensity of the medium along the scanned path;
  (e) means for sampling and digitizing said sensor signals at predetermined intervals of time for producing a plurality of discrete digitized representations of the image along the scanned path; and
  (f) means storing said discrete digitized representations in a memory for producing a bit-mapped representation of the scanned path.

* * * * *